May 17, 1966  T. W. O'BRIEN  3,251,336
GAS SAFETY VENT COVER WITH INDICATING MEANS
Filed Aug. 27, 1964
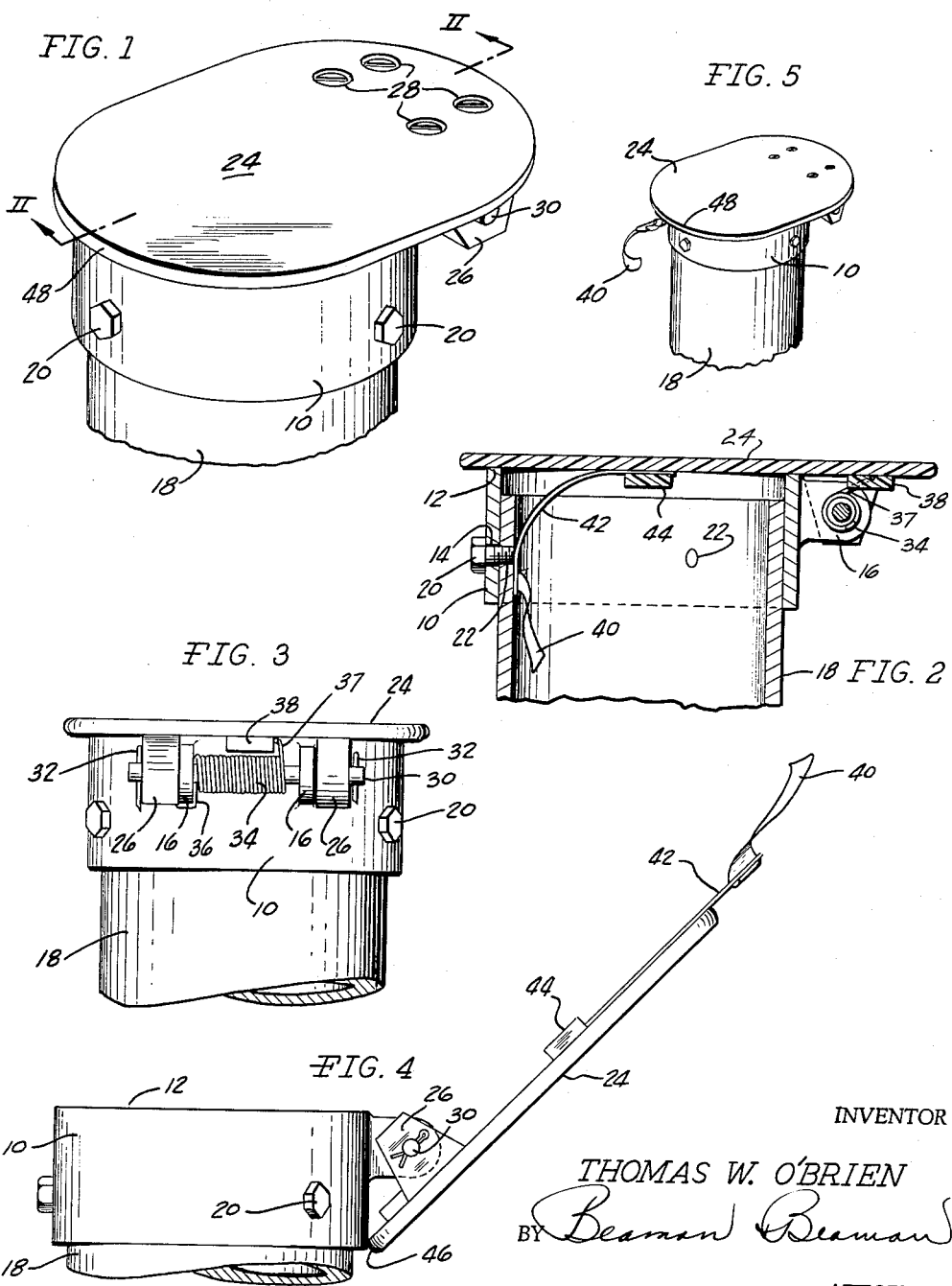
INVENTOR
THOMAS W. O'BRIEN
BY Beaman & Beaman
ATTORNEYS

United States Patent Office 3,251,336
Patented May 17, 1966

3,251,336
GAS SAFETY VENT COVER WITH INDICATING MEANS
Thomas W. O'Brien, Jackson, Mich., assignor to Plastigage Corporation, Jackson, Mich., a corporation of Michigan
Filed Aug. 27, 1964, Ser. No. 392,546
4 Claims. (Cl. 116—132)

The invention pertains to a cover or cap for vents and the like and particularly relates to a cover adapted to indicate when the cover has been opened by the passage of gas or other fluid through the vent associated therewith.

Natural gas pipe lines, petroleum refineries, air and gas pumping stations and similar installations usually include venting conduits communicating with pressure relief valves or similar safety devices. Such venting conduits discharge into the atmosphere and are normally directed upward. Upon an abnormal pressure condition existing within the pressurized system, the release valve, or other safety device associated with the vent, will open and discharge excessive gas, air, or other pressurized fluid through the vent into the atmosphere. In that large capacities of gas, or other fluids, pass through such vents during a "blow-off," conventional ventilating type caps and covers are unsuitable with such vents, as they will be blown off or damaged by the gas pressure passing through the vent. However, as it is desirable to vent the escaping gases upwardly, rain, snow and other foreign matter will enter the vent and cause corrosion thereof unless a cover of some type is provided.

The invention pertains to a safety vent cover which may be employed with high pressure gas vents, or the like, wherein the passage of high pressure gas through the vent will open the cover without damage thereto. The cover does not form a restriction to the gas flow through the vent, and indicating means are associated with the cover to indicate when the cover has opened. The indicating means permits maintenance personnel to determine when a safety pressure relief valve has operated that the abnormal conditions which may have caused the operation of the relief valve may be remedied.

It is, therefore, an object of the invention to provide a safety vent cover or cap for a venting conduit which prevents the entrance of corrosive elements into a vent conduit and is, itself, substantially immune to corrosion.

Another object of the invention is to provide a safety vent cover employing indicating means wherein opening of the vent cover to permit the escape of a pressurized gas or fluid will be indicated until the indicating means is manually reset.

Another object of the invention is to provide a vent cover of economical construction which is of high strength and may be easily installed upon conventional venting conduits.

These and other objects of the invention arising from the details and relationships of the components of an embodiment thereof will be apparent from the following description and accompanying drawings wherein:

FIG. 1 is a perspective view of a vent cover mounted upon a vent conduit, illustrating the cover in the normal closed condition, FIG. 2 is an elevational, sectional view along section II—II of FIG. 1, FIG. 3 is an elevational view of the rear of a vent cover in accord with the invention, illustrating the hinge structure, FIG. 4 is an elevational view of a vent cover in accord with the invention, as shown pivoted to the full open position as occurs on initial opening of the cover, and FIG. 5 is a reduced scale perspective view of the cover in accord with the invention after the lid has opened and reclosed, wherein the indicator is visible.

The basic component of the vent cover in accord with the invention comprises an annular base 10, preferably cast of aluminum. The base 10 is provided with a planar upper edge 12, and a plurality of holes 14, three in the illustrated embodiment, radially extend through the cylindrical portion of the base. A pair of spaced parallel ears 16 are integrally cast on the base for support of the lid hinge, as will be later described.

The base 10 is affixed to the upper end of the vent conduit 18 by means of bolts 20 passing through the base holes 14 and threaded into threaded holes 22 defined in the vent conduit. The vent conduit 18 usually communicates with pressure relief valve means, or other control devices, not shown, regulating the flow of gas or other fluid into the conduit.

A lid 24 is pivotally mounted upon the base 10 for seating upon the upper edge 12 and preventing the entrance of rain, snow, or other foreign matter, into the vent conduit 18. The lid 24 is preferably formed of a synthetic plastic material of a rigid characteristic, and is provided with a pair of downwardly extending spaced, parallel bosses 26, which may be affixed to the lid by means of cement, or screws 28, FIG. 1, or both. It will be noted that the configuration of the lid 24 is such as to enclose the top of the base 10 and extend over the hinge structure.

Suitable holes are provided in the base ears 16 and the lid bosses 26 to receive a hinge pin 30 extending therethrough, as will be apparent from FIG. 3. The pin 30 is maintained in position by cotter pins 32 located at each end of the pivot pin. A torsion spring 34 circumscribes the pin 30 intermediate the ears 16 and has an end 36 bearing against the left ear 16, FIG. 3. The other end 37 of spring 34 is affixed to the lid 24 by a synthetic plastic block 38, bonded to the underside of the lid. The spring 34 is wound in such a manner that the spring biases the lid to the closed position shown in FIGS. 1, 2, 3 and 5.

The indicating means takes the form of a flag 40 affixed to the end of a flexible and resilient staff 42 attached to the underside of the lid 24 by a synthetic plastic block 44. The staff 42 may be formed of a spring steel or of a synthetic plastic material, and the flag 40 is preferably of a flexible nature such as of plastic film or fabric, and may be brightly colored as to be readily visible. The normal undeformed shape of the staff 42 is that shown in FIG. 4 which is substantially parallel to the plane of the lid 24.

In operation, the vent cover is affixed to the top of a vent conduit 18 by bolts 20, as described. The flag staff 42 is bent so as to be inserted within the vent conduit 18 and is maintained in the position which will be apparent from FIG. 2, in that the outer end of the staff will engage the inner surface of the vent conduit. The lid 24 is in sealed engagement with edge 12. Upon the flow of pressurized gas or other fluid through the vent conduit, the lid 24 will be initially forced open to the position of FIG. 4, wherein the rotation of the lid upon the pin 30 will be limited upon the rear edge 46 of the lid engaging the base. After the initial pivoting action of the lid has occurred, the biasing force imposed upon the lid by the spring 34 will attempt to seat the lid upon the base edge 12. However, the force of the gases passing through the vent conduit will normally maintain the lid in a substantially vertical position until the gas flow has ceased. Thereupon, the spring 34 will again seat the lid upon the base edge 12, as shown in FIG. 5. When the lid 24 opened under the influence of the pressurized vented gas, the flagstaff 42 was moved from engagement with conduit 18 and permitted to assume its normal position shown in FIG. 4. As the length of the staff 42 is such as to extend beyond the front edge 48 of the lid, reseating of the lid will locate the end of the staff, and the flag 40, exteriorly of the cover, as shown in FIG. 5. Maintenance personnel may now readily observe the flag 40 and will, therefore, know that gases have vented through the conduit 18. As the staff 42 is of a thin sheet material, it does not significantly affect the efficiency of the lid 24 to prevent the entrance of foreign matter into the vent conduit 18 even though the flag is exterior of the cover.

It is appreciated that modifications to the disclosed embodiment may be apparent to those skilled in the art without departing from the spirit and scope thereof, and it is intended that the invention be defined only by the following claims.

I claim:
1. A vent cover comprising, in combination
   (a) an annular base adapted to be affixed to a vent conduit, an annular edge defined upon said base,
   (b) a lid,
   (c) pivot means pivotally mounting said lid upon said base for pivotal movement between open and closed positions, said lid being disposed adjacent said annular edge at said closed position and removed from said edge at said open position,
   (d) means biasing said lid toward said closed position, and
   (e) indicating means mounted on said lid and extending exteriorly beyond said annular edge upon said lid being returned from said open position to said closed position for indicating the occurrence of movement of said lid from said closed position to said open position.

2. A vent cover comprising, in combination,
   (a) an annular base adapted to be affixed to a vent conduit, an annular edge defined upon said base,
   (b) a lid,
   (c) pivot means pivotally mounting said lid upon said base for pivotal movement between open and closed positions, said lid being disposed adjacent said annular edge at said closed position and removed from said edge at said open position,
   (d) means biasing said lid toward said closed position, and
   (e) a flexible, resilient flag staff affixed to said lid having a free outer end, a flag affixed to said outer end, said flag adapted to be inserted within said base upon said lid being in the closed position and extend from said base upon said lid pivoting to said open position and returning to the closed position.

3. A vent cover comprising, in combination,
   (a) an annular base adapted to be affixed to a vent conduit, an annular edge defined upon said base,
   (b) a lid having an underside,
   (c) pivot means pivotally mounting said lid upon said base for pivotal movement between open and closed positions, said lid underside being disposed adjacent said annular edge at said closed position and removed from said edge at said open position,
   (d) means biasing said lid toward said closed position, and
   (e) a resiliently supported indicator mounted to the underside of said lid, said indicator adapted to be deformed from its normal configuration and located within said base upon said lid being in said closed position, said indicator being of such length as to project from said base and beyond said lid upon said lid pivoting to said open position and returning to the closed position.

4. A vent cover for a vent conduit having an annular end edge comprising, in combination,
   (a) a base adapted to be affixed to said vent conduit adjacent said annular edge,
   (b) a lid,
   (c) pivot means pivotally mounting said lid upon said base for pivotal movement between open and closed positions, said lid being disposed adjacent said conduit annular end edge at said closed position and removed from said edge at said open position,
   (d) means biasing said lid toward said closed position, and
   (e) resettable indicating means mounted on said cover adapted to be tripped upon said lid moving from said closed position to said open position indicating the occurrence of movement of said lid from said closed position to said open position; said indicating means requiring manual resetting.

References Cited by the Examiner
UNITED STATES PATENTS

| | | | |
|---|---|---|---|
| 2,463,662 | 3/1949 | Wallace | 98—59 |
| 3,015,337 | 1/1962 | Hookway | 137—553 X |
| 3,074,588 | 1/1963 | Burdue | 220—44 |

WILLIAM F. O'DEA, *Primary Examiner.*
ROBERT A. O'LEARY, *Examiner.*